(12) United States Patent
Janik et al.

(10) Patent No.: US 6,364,121 B1
(45) Date of Patent: Apr. 2, 2002

(54) FILTER CARTRIDGE WITH GROMMET SPRING

(75) Inventors: Leon P. Janik, Suffield; Michael J. Williams, Glastonbury, both of CT (US)

(73) Assignee: Stanadyne Corporation, Windsor, CT (US)

( * ) Notice: Subject to any disclaimer, the term of this patent is extended or adjusted under 35 U.S.C. 154(b) by 0 days.

(21) Appl. No.: 09/357,049

(22) Filed: Jul. 19, 1999

(51) Int. Cl.⁷ .............................................. B01D 27/08
(52) U.S. Cl. ...................... 210/438; 210/440; 210/444; 210/450; 277/918
(58) Field of Search .................. 210/432, 438, 210/440, 443, 444, 450, 458, DIG. 17; 277/918

(56) References Cited

U.S. PATENT DOCUMENTS 4,052,317 A * 10/1977 Palnik ........................ 210/450
5,271,836 A * 12/1993 Janik et al. .................. 210/232

* cited by examiner

Primary Examiner—Matthew O. Savage
(74) Attorney, Agent, or Firm—Alix, Yale & Ristas, LLP

(57) ABSTRACT

A filter cartridge for use with a base to create a filter assembly. The filter cartridge includes a seal to establish a fluid flow within the filter assembly and a resilient bias member to bias the filter cartridge away from the base. The resilient bias member in cooperation with a fastening mechanism secures the filter cartridge to the base.

15 Claims, 4 Drawing Sheets

FILTER CARTRIDGE WITH GROMMET SPRING

BACKGROUND OF THE INVENTION

This invention relates generally to fluid filters employed in connection with internal combustion engines. More particularly, the present invention relates to fuel filters and lubricating oil filters having a replaceable cartridge for removing foreign particles and/or separating water from the fuel supply or oil system of an internal combustion engine.

Conventionally, fuel filters employ a disposable filter cartridge which is replaced at pre-established intervals of filter usage. The filter cartridge is removably installed to a filter base or header. While a number of different methods and structures may be used to join the filter cartridge to the base, all of the methods and structures require general alignment of a filter cartridge axis with a base axis. For some filter assemblies to which the invention relates a retaining collar or ring is employed to facilitate the securement function. A resilient bias between the base, filter cartridge and/or retaining collar is required both to help secure the cartridge to the base and also to allow removal of the installed filter cartridge from the base.

Typically, a metallic spring is disposed between the base and filter cartridge or engageably against the retaining collar to provide the required resilient biasing. The spring can be relatively complex. For example, U.S. Pat. No. 5,203,994 discloses a three-dimensional star shaped spring disposed between the base and filter cartridge. U.S. Pat. No. 5,302,284 discloses a wave spring disposed between the filter cartridge and retaining collar. The use of a separate metallic spring represents cost and complexity to the filter assembly, both for the manufacture of the spring as well as for its installation onto the base.

SUMMARY OF THE INVENTION

Briefly stated, the invention in a preferred form is a filter cartridge incorporating a novel multi-function grommet spring which both provides a bias function for securement purposes and a sealing function for fluidly sealing the filter cartridge with a base.

The base is of a type having an inlet and an outlet fluidly connected to the engine fuel system. A replaceable filter cartridge is mountable to the base. The replaceable cartridge includes a generally cylindrical housing which houses the fuel filter elements. The top surface of the cartridge defines a circular opening for receiving a fluid flow from the base and for discharging a filtered fluid flow to the base. A grommet spring is mounted to the top surface coaxially around the opening. One end of the grommet spring preferably projects substantially orthogonally from the top surface of the cartridge to form a resilient annular contact surface. The opposing end of the grommet spring is enclosed within the filter cartridge and defines a circular seal portion with a radially inwardly facing seal lip.

When the filter cartridge is secured to the filter base, the seal lip circumferentially contacts a fluid conduit projecting from the base to establish the fluid circuit between the filter cartridge and filter base. In addition, the projecting contact surface is compressed between the filter base and top surface of the cartridge, resiliently biasing the filter cartridge away from the filter base.

An object of the invention is to provide a new and improved disposable filter cartridge.

Another object of the invention is to provide a fuel cartridge biasing structure which is efficient, cost effective and reliable.

A further object of the invention is to provide a new and improved filter cartridge comprising an improved biasing structure for releasably biasing the cartridge to secure installed position in a fuel filter assembly.

Other objects and advantages of the invention will become apparent from the specification and the drawings.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF A PREFERRED EMBODIMENT

Figure 1:
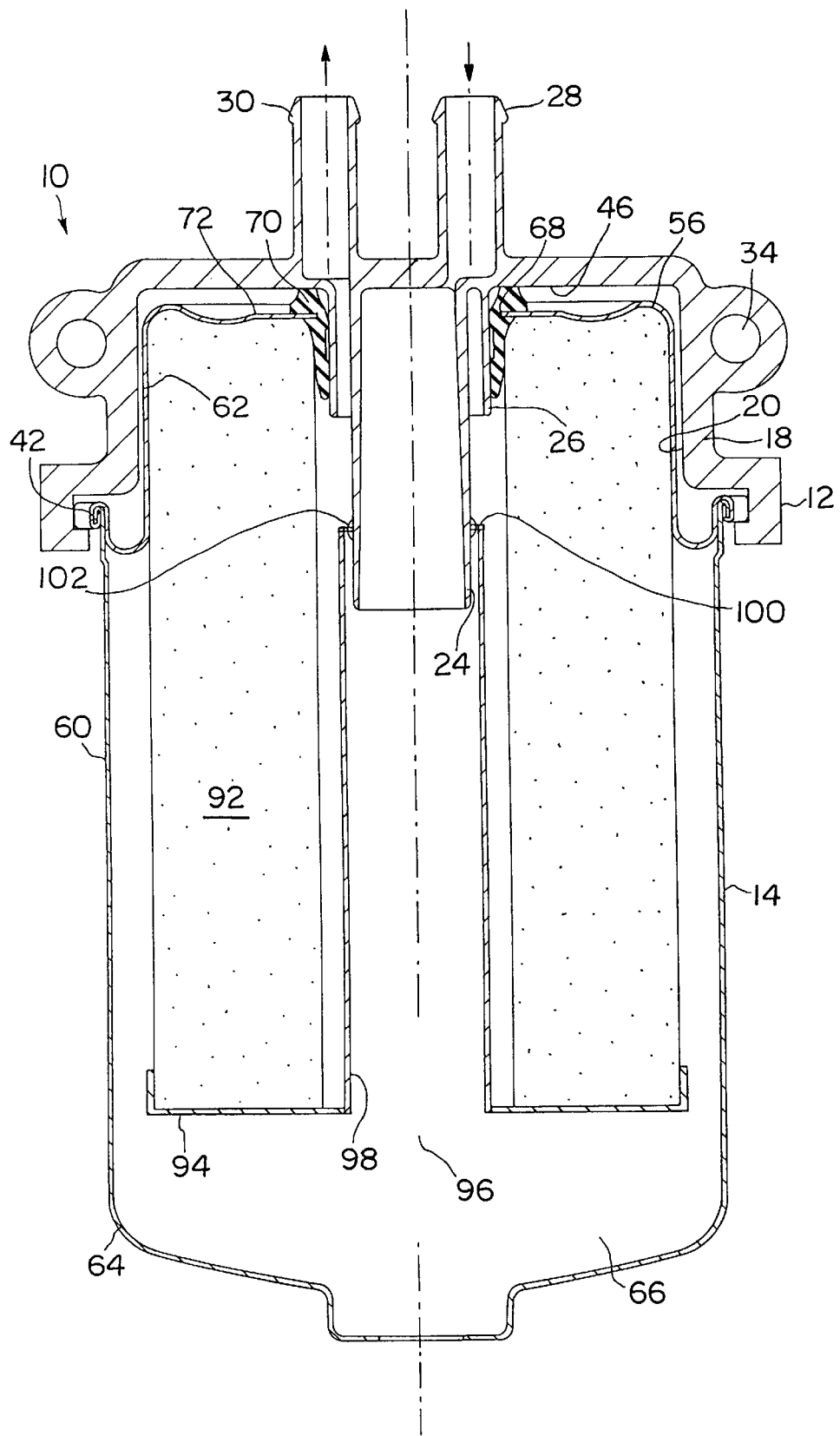
FIG. 1 is a sectional elevational view of a fuel filter assembly in accordance with an embodiment of the invention.

With reference to the drawings wherein like numerals represent like parts throughout the several figures, a preferred filter assembly in accordance with the present invention is generally designated by the numeral 10. As shown in FIG. 1, the filter assembly 10 comprises a base 12 and a disposable filter cartridge 14. The base 12 is generally disposed above the disposable filter cartridge 14. Alternatively, the base 12 and filter cartridge 14 may be inverted, wherein the filter cartridge 14 is disposed above the base 12. In either alternative, the filter cartridge 14 must be physically joined to the base 12 and in fluid communication to create the filter assembly 10. The filter assembly 10 is especially adapted for incorporation into the fuel supply system of an internal combustion engine (not illustrated), such as a diesel engine, for removing particulate matter from fuel and separating water from the fuel. Filter assemblies of this type may also be used to filter impurities from oil in the lubricating system of an internal combustion engine.

The base 12 and the disposable cartridge 14 may assume a wide variety of configurations. For one disclosed embodiment, the base 12 is an inverted cup-like receptacle which forms a skirt 18 defining a lower receptacle cavity 20 for receiving an upper portion of the disposable filter cartridge 14. An inner, elongated, sleeve-like first conduit 24 and an outer, concentric, sleeve-like second conduit 26 provide generally co-axial fluid communication between the base 12 and the disposable filter cartridge 14.

An inlet connector 28 of the base 12 connects with the engine fuel line (not illustrated) to ultimately provide fluid communication through the interior passageway defined by the first conduit 24. An outlet connector 30 of the base 12 connects with the fuel line to provide external fluid communication from the axial fluid passageway defined between the first and second conduits 24, 26. A pair of openings 34 for anchoring the filter base 12 to the engine, extend transversely from the base 12.

With reference to FIG. 1, a base planar surface 46 is positioned within the lower receptacle cavity 20 and radially extends from the conduits 24, 26. Preferably the base planar surface 46 extends from the conduits 24, 26 to the skirt 18, although the planar surface may also terminate at a point intermediate the conduits and skirt. A resilient bias force is releasably exerted by the grommet spring 70 which is compressed against the planar surface 46. The resilient bias force in cooperation with the fastening mechanism releasably secure the cartridge 14 and base 12 together to form the filter assembly 10.

The disposable filter cartridge 14 comprises a can-like housing 60 formed by a pair of opposed lower and upper cup-like sections 64, 62, respectively. The sections 62, 64 are joined along a circumferential roll seam 42. A sump 66 is formed at the bottom of the lower section 64 to collect any water which coalesces from the fuel. The lower section 64 may incorporate a selectively actuatable valve or draincock (not shown) to permit draining of the collected water.

The upper section 62 is smaller in diameter than the lower section 64 and is dimensioned to be closely accommodated within the base cavity 20. Preferably, the top portion 72 of the upper section 62 of the filter cartridge housing 60 has a longitudinally upward bend configuration which forms an annular ridge 56. Also, the ridge 56 is preferably disposed along the circumference of the top portion 72. The annular ridge 56 adds strength to the filter cartridge and may also act as an axial stop. A central axial opening 68 in the top portion 72 of the upper section 62 is dimensioned to receive the conduits 24, 26. A grommet spring 70 is mounted at the opening 68. Preferably, the grommet spring 70 is bonded to the top portion 72 of the upper section 64.

Figure 4A:
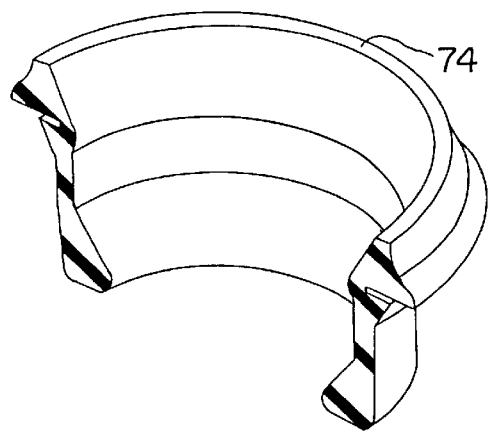
FIGS. 4a, 4b and 4c are fragmentary perspective views, partially in section, of grommet spring embodiments illustrating variations of the biasing structure.

The grommet spring 70 includes a contact surface 74 axially projecting away from the top portion 72. Preferably, the contact surface is annular as shown in FIG. 4a. The annular contact surface 74 contacts the base planar surface 46 and is compressed between the planar surface 46 and the filter cartridge top portion 72, when the filter cartridge 14 is secured to the filter base 12. The compression results in a radial expansion of the contact surface 74 where it contacts the base planar surface 46.

Naturally, while in the preferred embodiment the grommet spring 70 comprises the annular contact surface 74, it is also be possible to resiliently bias the filter cartridge 14 with a separate bias member (not shown) mounted to the top portion 72. The separate bias member would include the contact surface 74 in this embodiment.

Figure 4B:
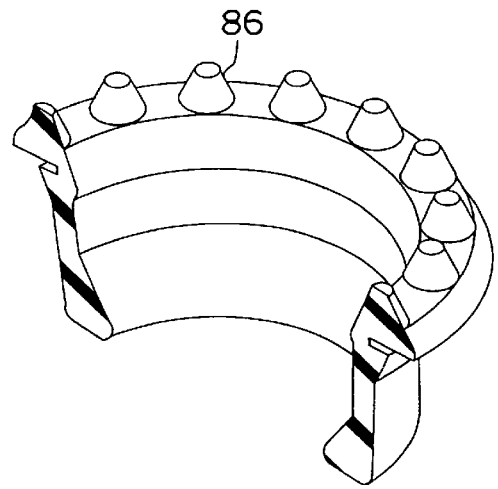
Figure 4C:
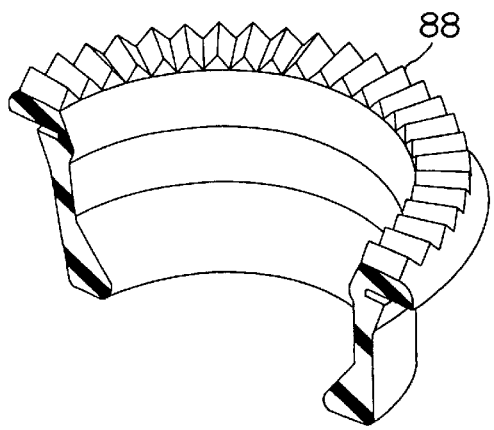

Further, while the annular surface 74 may be axially tapered to a level contact surface of uniform thickness as shown in FIG. 4a, castellated or other discontinuous non-level contact surfaces are also capable of providing the desired resilient biasing force between the filter base 12 and cartridge 14. As examples, the annular surface 74 may include angularly spaced, axially projecting conical projections 86, prismatic projections 88 or combinations thereof. See FIGS. 4b and 4c.

The contact surface 74, and preferably the complete grommet spring 70, is molded from a polymeric material. The polymeric material must provide a desired combination of moldability, chemical resistance and adequate resiliency to releasably maintain the filter assembly 10 in the fluidly coupled secured state in conjunction with a fastening mechanism. Preferably, the polymer material has a Shore "A" durometer hardness within the range of 55–85. The polymer material is also preferably sufficiently resilient to permit a displacement of up to 0.075 inches and preferably approximately 0.025 inches between the axially extended position and the axially compressed position. The axial compression of the material may be up to 30% for normal loading between the cartridge and the base. Polymeric materials, such as, for example, synthetic rubber of the type known as Buna Rubber, fluoroelastomer of the type known as VITON (available from DuPont) and fluorosilicone have been found to provide the desired properties when formed into a grommet spring 70.

Figure 2:
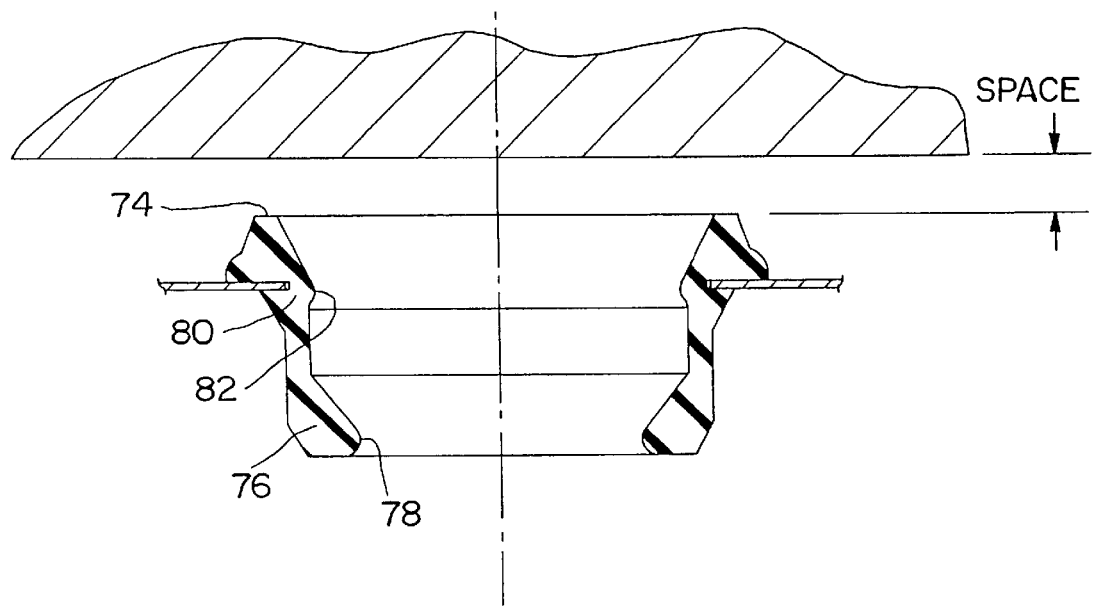
FIG. 2 is an enlarged fragmentary sectional view of an embodiment of the inventive grommet spring of the filter cartridge of FIG. 1 prior to contact with a filter base.
Figure 3:
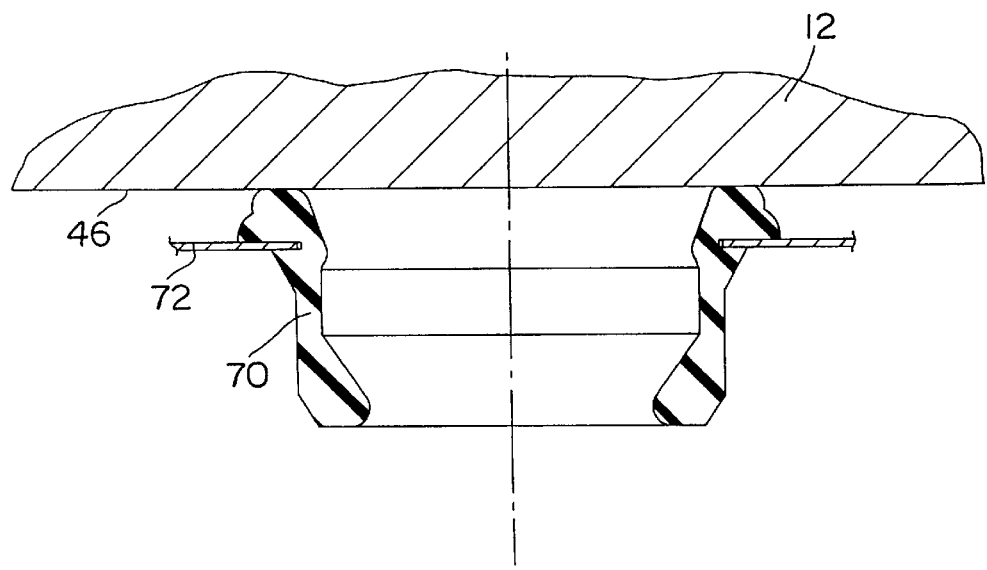
FIG. 3 is a view similar to FIG. 2 showing the filter cartridge secured to the filter base and the grommet spring compressed therebetween.

As shown best in FIG. 2, the opposing end of the grommet spring 70 comprises a circular first seal portion 76 for the filter cartridge 14. The first seal portion 76 includes a radially inwardly facing seal lip 78 which diametrically fluidically seals against the outer conduit 26 when the filter cartridge 14 is secured to the filter base 12. Preferably, the grommet spring 70 further includes a second seal portion 80 disposed intermediate the contact surface 74 and first seal portion 76. The second seal portion 80 includes a radially inwardly facing second seal lip 82. The first seal portion 76 is radially inwardly biased so that when the filter cartridge 14 is separated from the filter base 12 the first and second seal lips 78, 82, respectively, have different diameters. When the filter cartridge 14 is secured to the filter base 12 such that the first and second seal lips 78, 82 are sealingly engaged with the outer conduit 26, the diameters of the seal lips 78, 82 are substantially the same as shown in FIG. 1.

The cartridge 14 may employ a dual stage filter assembly (not shown) or a single stage filter assembly as illustrated in FIG. 1. In the single stage filter assembly, a filter element 92 which may have a continuous fan-shaped pleated configuration is mounted in the enclosure 60. The lower end of the element 92 is engaged by a medial plate 94 having a central opening 96. A tubular conduit 98 extends upward from the medial plate 94. The tubular conduit 98 upper end defines a flange 100. A sealing grommet 102 mounted to the flange 100 receives and diametrally seals against the lower end of the base first conduit 24.

Fuel enters the fuel filter assembly 10 through the fuel inlet passage 28 and exits the filter through the outlet passage 30. It will be appreciated that the fuel flow path initially axially traverses through the interior of the inner conduit 24 and tubular conduit 98. The circulation path curves around the medial plate 94 and extends generally axially upwardly and generally radially inwardly through the filter element 92 with the return flow path traversing between the inner conduit 24 and the outer conduit 26 into the outlet passage 30.

Figure 5:
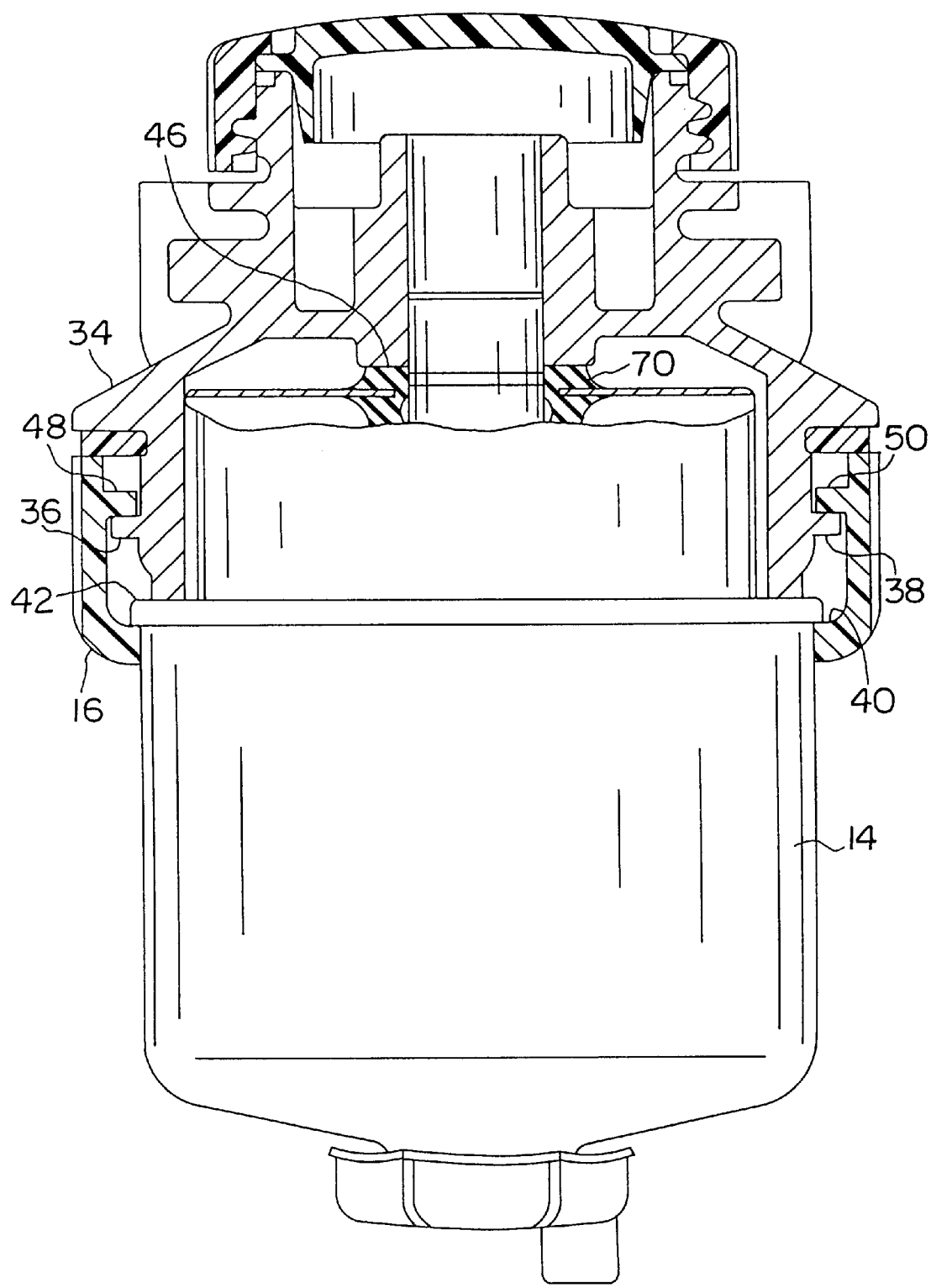
FIG. 5 is a sectional view, partly broken away, of a fuel filter assembly illustrating a cartridge fastening mechanism.

A fastening mechanism acts in concert with the bias force exerted by the contact surface 74 against the base planar surface 46 to secure the filter cartridge 14 to the base 12. One fastening mechanism is shown in FIG. 5, wherein a base 34 includes a pair of integral outwardly projecting diametrically opposed ramps 36, 38 which ascend in spiral-like fashion around the base 34. The upper ends of the ramps 36, 38 are beveled. An annular collar 16 includes a pair of diametrically disposed spiral followers 48, 50 which integrally extend inwardly from the collar 16. The followers 48, 50 are dimensioned and positioned for engagement with the ramps 36, 38 so that the followers 48, 50 slidably engage and ascend the ramps 36, 38 upon alignment and angular rotation of the collar 16. The collar 16 includes an inwardly projecting annular shoulder 40 which may engage the roll seam 42 of the cartridge 14 for releasably securing the cartridge 14 to the base 34 in cooperation with the contact surface 74.

While a detailed structure for a mechanism to releasably fasten the filter cartridge 14 to the base 12, 34 has been set forth for purposes of illustration, it should be understood that the inventive filter cartridge and grommet spring is not limited to this described structure and can find application in filter assemblies using different filter cartridge fastening mechanisms.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter cartridge for mounting to a base, the base defining a substantially planar receiving surface and including conduit means extending orthogonally from said receiving surface and coaxially with a base axis, the cartridge comprising:

filter means for filtering a flow of liquid, said filter means comprising at least one filter element;

housing means for housing said filter means, said housing means comprising opposing first and second shell sections, said sections being generally symmetric about a cartridge axis and being joined together, said second section including an end surface axially spaced from said first section, said end surface defining a cartridge opening coaxial with said cartridge axis;

cartridge seal means enclosed within said housing for fluidly sealing said conduit means, said seal means including a seal lip coaxial with and orthogonal to said cartridge axis; and cartridge bias means axially extending from said cartridge seal means for resilient displacement between an extended position and a compressed position between said end surfaced and said receiving surface, said compressed position producing a resilient biasing force urging said cartridge away from said receiving surface, wherein said cartridge bias means terminates in an axially protecting contact surface defined by a plurality of anaularly spaced axial projections.

2. The filter cartridge of claim 1, wherein said cartridge bias means is comprised of a polymer.

3. The filter cartridge of claim 2, wherein said polymer has a Shore A durometer hardness of 55 to 85.

4. The filter cartridge of claim 2, wherein said polymer is selected from the group consisting of synthetic rubber, fluoroelastomer and fluorosilicone.

5. The filter cartridge of claim 1, wherein said cartridge seal means and said cartridge bias means are a unitary component comprising a grommet spring.

6. The filter cartridge of claim 5, wherein said grommet spring is mounted to said end surface adjacent said opening.

7. The filter cartridge of claim 1, wherein said cartridge seal means is disposed between said end surface and said first shell section.

8. The filter cartridge of claim 1, wherein said projections have a generally conical shape.

9. The filter cartridge of claim 1, wherein said projections have a prismatic shape.

10. A filter cartridge for mounting to a base, the base defining a receiving surface and including conduit means extending axially from said receiving surface and including conduit means extending axially from said receiving surface, the cartridge comprising:

filter means for filtering a flow of liquid, said filter means comprising at least one filter element;

housing means for housing said filter means, said housing means comprising opposite, axially spaced first and second end surfaces and being generally symmetric about a cartridge axis, one end surface defining a cartridge opening coaxial with said cartridge axis; and a grommet member, said grommet member including a first axially protruding portion which upon compression biases said cartridge away from said base and a second portion which radially inwardly fluidly seals against said conduit means upon reception of said conduit means in said opening,
       wherein said first axially protruding portion terminates in an axially protecting contact surface defined by a plurality of anaularly spaced axial protections.

11. The filter cartridge of claim 10, wherein said grommet member is comprised of a polymer.

12. The filter cartridge of claim 11, wherein said polymer has a Shore A durometer hardness of 55 to 85.

13. The filter cartridge of claim 11, wherein said polymer is selected from the group consisting of synthetic rubber, fluoroelastomer and fluorosilicone.

14. The filter cartridge of claim 10, wherein said projections have a generally conical shape.

15. The filter cartridge of claim 10, wherein said projections have a prismatic shape.

* * * * *

UNITED STATES PATENT AND TRADEMARK OFFICE
CERTIFICATE OF CORRECTION

PATENT NO.    : 6,364,121 B1
DATED         : April 2, 2002
INVENTOR(S)   : Janik et al.

It is certified that error appears in the above-identified patent and that said Letters Patent is hereby corrected as shown below:

<u>Column 5,</u>
Line 40, change "protecting" to -- projecting --.
Line 41, change "anaularly" to -- angularly --.

<u>Column 6,</u>
Line 34, change "protecting" to -- projecting --.
Line 35, change "anaularly" to -- angularly --.

Signed and Sealed this

Twenty-sixth Day of November, 2002

Attest:

Attesting Officer

JAMES E. ROGAN
*Director of the United States Patent and Trademark Office*